US012327868B2

(12) United States Patent
Kuroda et al.

(10) Patent No.: US 12,327,868 B2
(45) Date of Patent: Jun. 10, 2025

(54) POSITIVE ELECTRODE ACTIVE MATERIAL FOR SECONDARY BATTERY, AND SECONDARY BATTERY

(71) Applicant: Panasonic Intellectual Property Management Co., Ltd, Osaka (JP)

(72) Inventors: Kosuke Kuroda, Osaka (JP); Mitsuhiro Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 498 days.

(21) Appl. No.: 17/772,409

(22) PCT Filed: Oct. 13, 2020

(86) PCT No.: PCT/JP2020/038573
§ 371 (c)(1),
(2) Date: Apr. 27, 2022

(87) PCT Pub. No.: WO2021/085112
PCT Pub. Date: May 6, 2021

(65) Prior Publication Data
US 2022/0376244 A1    Nov. 24, 2022

(30) Foreign Application Priority Data
Oct. 29, 2019    (JP) .................................. 2019-196425

(51) Int. Cl.
*H01M 4/525*    (2010.01)
*H01M 4/485*    (2010.01)
(Continued)

(52) U.S. Cl.
CPC ............ *H01M 4/525* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| 2009/0148772 | A1 | 6/2009 | Kawasato et al. |
| 2011/0244332 | A1 | 10/2011 | Saito et al. |
| 2015/0243980 | A1 | 8/2015 | Kawada |

FOREIGN PATENT DOCUMENTS

| CN | 104882592 A | 9/2015 |
| JP | 2000-82466 A | 3/2000 |

(Continued)

OTHER PUBLICATIONS

Machine Translation of JP2009238587 (Year: 2009).*
(Continued)

*Primary Examiner* — Wyatt P McConnell
(74) *Attorney, Agent, or Firm* — WHDA, LLP

(57) ABSTRACT

The positive electrode active material for a secondary battery includes a lithium-transition metal composite oxide. The lithium-transition metal composite oxide is represented by the general formula $Li_\alpha[Li_xMn_yCo_zMe_{(1-x-y-z)}]O_2$ (in the formula, Me is at least one selected from Ni, Fe, Ti, Bi, and Nb, $0.5<\alpha<1$, $0.05<x<0.25$, $0.4<y<0.7$, $0<z<0.25$) and has a crystal structure of O2 structure. The particle size distribution of the lithium-transition metal composite oxide has a first peak on the small particle size side and a second peak on the large particle size side.

4 Claims, 1 Drawing Sheet

(51) Int. Cl.
*H01M 4/505* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

FOREIGN PATENT DOCUMENTS

| | | | |
|---|---|---|---|
| JP | 2008-13405 | A | 1/2008 |
| JP | 2009238587 | * | 10/2009 |
| JP | 2011-228273 | A | 11/2011 |
| JP | 2012-204281 | A | 10/2012 |
| JP | 5292885 | B2 | 9/2013 |
| JP | 2015-179661 | A | 10/2015 |
| JP | 2018-41657 | A | 3/2018 |
| WO | 2008/084679 | A1 | 7/2008 |

OTHER PUBLICATIONS

Office Action dated Jan. 26, 2024, issued in counterpart CN Application No. 202080075211.5, with partial English translation. (10 pages).

Extended (Supplementary) European Search Report dated Nov. 25, 2022, issued in counterpart EP Application No. 20882259.3. (7 pages).

International Search Report dated Dec. 22, 2020, issued in counterpart International Application No. PCT/JP2020/038573, with English Translation. (5 pages).

* cited by examiner

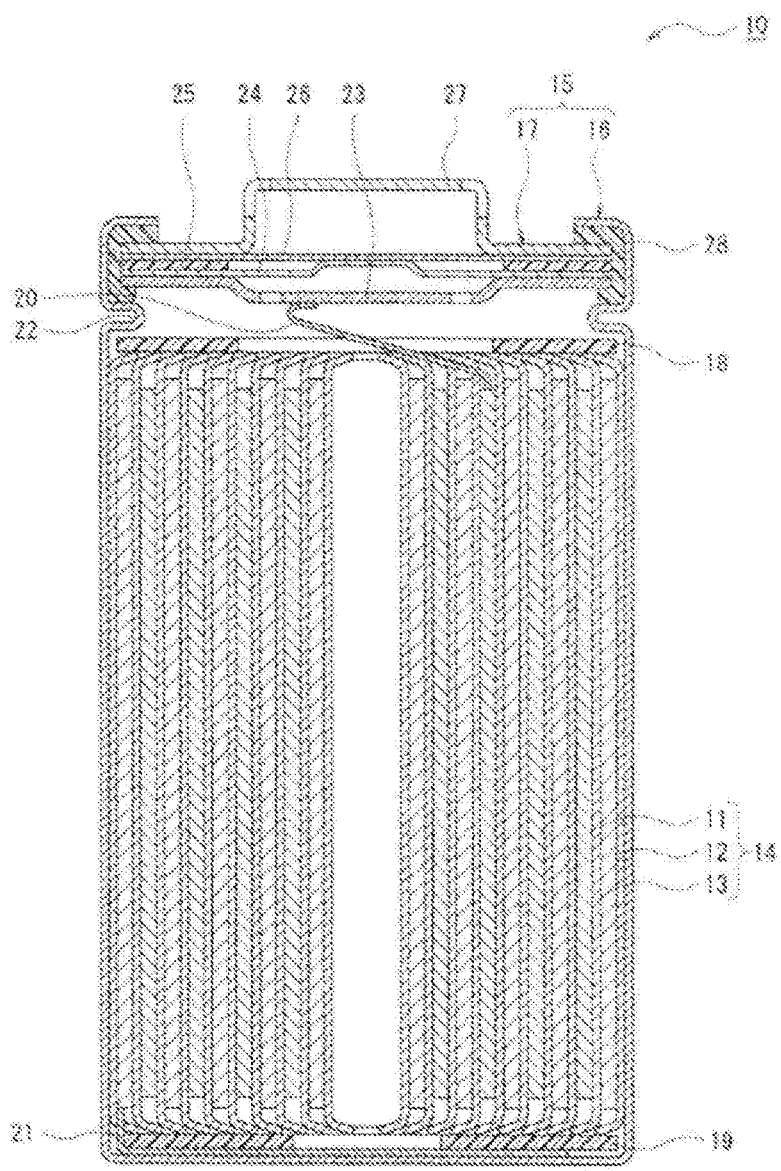

POSITIVE ELECTRODE ACTIVE MATERIAL FOR SECONDARY BATTERY, AND SECONDARY BATTERY

CROSS-REFERENCE TO RELATED APPLICATIONS

This application is a national stage of International Application No. PCT/JP2020/038573, filed Oct. 13, 2020, which claims priority to Japanese Patent Application No. 2019-196425 filed Oct. 29, 2019 both of which are hereby incorporated by reference in their entirety.

TECHNICAL FIELD

The present disclosure relates to a positive electrode active material for a secondary battery, and a secondary battery in which the positive electrode active material is used.

BACKGROUND

Conventionally, lithium-transition metal composite oxides have been widely used as a positive electrode active material for a secondary battery such as a lithium ion battery. For example, Patent Literature 1 discloses a lithium-transition metal composite oxide having a crystal structure defined by an O2 structure and including Li in the transition metal layer. Also among lithium-transition metal composite oxides having a crystal structure defined by an O3 structure, a composite oxide including Li in the transition metal layer is known.

CITATION LIST

Patent Literature

Patent Literature 1: JP 2012-204281 A

SUMMARY

Lithium-transition metal composite oxides having an O2 structure can suppress a voltage drop in a charge-discharge cycle of a secondary battery more than Lithium-transition metal composite oxides having an O3 structure, but have problems of the low capacity of the secondary battery and the low capacity maintenance rate in the charge-discharge cycle.

A positive electrode active material for a secondary battery of an aspect of the present disclosure includes a lithium-transition metal composite oxide, and the lithium-transition metal composite oxide is represented by the general formula $Li_\alpha[Li_xMn_yCo_zMe_{(1-x-y-z)}]O_2$ wherein Me is at least one selected from Ni, Fe, Ti, Bi, and Nb, $0.5<\alpha<1$, $0.05<x<0.25$, $0.4<y<0.7$, and $0<z<0.25$, the lithium-transition metal composite oxide has a crystal structure of an O2 structure, and the lithium-transition metal composite oxide has a particle size distribution having a first peak in a small particle diameter side and a second peak in a large particle diameter side.

A secondary battery of an aspect of the present disclosure includes a positive electrode including the positive electrode active material, a negative electrode, and an electrolyte.

According to the positive electrode active material for a secondary battery of an aspect of the present disclosure, it is possible to improve the capacity of the secondary battery and to suppress a decrease in the capacity maintenance rate in a charge-discharge cycle.

BRIEF DESCRIPTION OF DRAWINGS

FIG. 1 is a sectional view of a secondary battery of an example of an embodiment.

DESCRIPTION OF EMBODIMENTS

A positive electrode active material for a secondary battery of an aspect of the present disclosure includes a lithium-transition metal composite oxide, and the lithium-transition metal composite oxide is represented by the general formula $Li_\alpha[Li_xMn_yCo_zMe_{(1-x-y-z)}]O_2$ wherein Me is at least one selected from Ni, Fe, Ti, Bi, and Nb, $0.5<\alpha<1$, $0.05<x<0.25$, $0.4<y<0.7$, and $0<z<0.25$, the lithium-transition metal composite oxide has a crystal structure of an O2 structure, and the lithium-transition metal composite oxide has a particle size distribution having a first peak in a small particle diameter side and a second peak in a large particle diameter side. According to the positive electrode active material for a secondary battery of an aspect of the present disclosure, it is possible to improve the capacity of the secondary battery and to suppress a decrease in the capacity maintenance rate in a charge-discharge cycle. Although the mechanism of exerting the effect is not sufficiently clear, the following is considered. The lithium-transition metal composite oxide of the present disclosure includes particles in a first particle group corresponding to the first peak in the small particle diameter side and particles in a second particle group corresponding to the second peak in the large particle diameter side in the particle size distribution, and it is presumed that such a mixture of the particles in the first particle group having a small particle diameter and the particles in the second particle group having a large particle diameter improves the filling density of the positive electrode active material, and that the presence of the particles in the first particle group having a small particle diameter increases the contact area with the electrolyte liquid, and thus the capacity of the secondary battery is improved. Furthermore, the lithium-transition metal composite oxide represented by the above-described general formula and having an O2 structure has high stability of the crystal structure. Therefore, it is considered that when charge and discharge are repeated, collapse of the crystal structure is suppressed even in the particles in the first particle group having a small particle diameter and a wide reaction area and thus a decrease in the capacity maintenance rate in a charge-discharge cycle is suppressed.

Hereinafter, an example of a secondary battery of an aspect of the present disclosure will be described.

FIG. 1 is a sectional view of a secondary battery of an example of an embodiment. A secondary battery 10 shown in FIG. 1 includes a wound electrode assembly 14 in which a positive electrode 11 and a negative electrode 12 are wound with a separator 13 interposed therebetween, an electrolyte, insulating plates 18 and 19 disposed on the upper and lower sides of the electrode assembly 14 respectively, and a battery case 15 housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metal cases having a cylindrical shape, a square shape, a coin shape, a button shape, or the like, and resin cases (so-called laminated cases) formed by lamination with a resin sheet.

The electrolyte may be an aqueous electrolyte, but is preferably a non-aqueous electrolyte containing a non-aqueous solvent and an electrolyte salt dissolved in the non-aqueous solvent. As the non-aqueous solvent, for example, esters, ethers, nitriles, amides, and mixed solvents of two or more thereof are used. The non-aqueous solvent may contain a halogen-substituted solvent in which at least a part of hydrogen in a solvent described above is substituted with a halogen atom such as fluorine. As the electrolyte salt, for example, a lithium salt such as $LiPF_6$ is used. The electrolyte is not limited to a liquid electrolyte, and may be a solid electrolyte in which a gel polymer or the like is used.

The case body 16 is, for example, a bottomed cylindrical metal container. A gasket 28 is provided between the case body 16 and the sealing assembly 17 to ensure the sealability inside the battery. The case body 16 has an inward protrusion 22 in which, for example, a part of the side part of the case body 16 protrudes inward to support the sealing assembly 17. The inward protrusion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are stacked in this order from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and an insulating member 25 is interposed between the circumferential parts of the lower vent member 24 and the upper vent member 26. When the internal pressure of the secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the secondary battery 10 shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the inner surface of the bottom of the case body 16 by welding or the like, and the case body 16 serves as a negative electrode terminal.

Hereinafter, the positive electrode 11, the negative electrode 12, and the separator 13 will be described in detail.

[Positive Electrode]

The positive electrode 11 includes a positive electrode core and a positive electrode mixture layer provided on a surface of the positive electrode core. As the positive electrode core, a foil of a metal, such as aluminum, that is stable in a potential range of the positive electrode 11, a film in which the metal is disposed on its surface layer, or the like can be used. The positive electrode mixture layer includes a positive electrode active material, a binder, and a conductive agent, and is preferably provided on both surfaces of the positive electrode core excluding a portion to which the positive electrode lead 20 is connected. The positive electrode 11 can be produced by, for example, applying a positive electrode mixture slurry including a positive electrode active material, a binder, a conductive agent, and the like to the surface of a positive electrode core, drying the applied film, and then compressing the film to form a positive electrode mixture layer on both surfaces of the positive electrode core.

Examples of the conductive agent included in the positive electrode mixture layer include carbon materials such as carbon black, acetylene black, Ketjenblack, and graphite. Examples of the binder included in the positive electrode mixture layer include fluororesins such as polytetrafluoroethylene (PTFE) and polyvinylidene fluoride (PVdF), polyacrylonitrile (PAN), polyimides, acrylic resins, and polyolefins. These resins may be used in combination with a cellulose derivative such as carboxymethyl cellulose (CMC) or its salt, polyethylene oxide (PEO), or the like.

The positive electrode active material includes a lithium-transition metal composite oxide. The lithium-transition metal composite oxide is represented by the general formula $Li_\alpha[Li_xMn_yCo_zMe_{(1-x-y-z)}]O_2$ wherein Me is at least one selected from Ni, Fe, Ti, Bi, and Nb, $0.5<\alpha<1$, $0.05<x<0.25$, $0.4<y<0.7$, and $0<z<0.25$.

In the present embodiment, it is described that the positive electrode active material includes only the lithium-transition metal composite oxide (hereinafter, referred to as "composite oxide A"), but the positive electrode active material may include a compound other than the composite oxide A as long as an object of the present disclosure is not impaired.

The composite oxide A has a crystal structure of an O2 structure. The proportion of the O2 structure is preferably 50 vol % or more and more preferably 90 vol % or more in the crystal structure of the composite oxide A from the viewpoint of stability of the crystal structure and the like. Here, the O2 structure is a layered crystal structure in which lithium exists at the center of an oxygen octahedron and one unit cell has two kinds of overlapping forms between oxygen and a transition metal, and belongs to a space group P6$_3$mc. Such a layered crystal structure includes a lithium layer, a transition metal layer, and an oxygen layer. In the general formula of the composite oxide A, the lithium layer includes $Li_\alpha$, the transition metal layer includes $Li_xMn_yCo_zMe_{(1-x-y-z)}$, and the oxygen layer includes $O_2$.

The composite oxide A may include a composite oxide having a T2 structure or an O6 structure synthesized as a by-product during synthesis of the composite oxide A. Here, the T2 structure is a layered crystal structure in which lithium exists at the center of an oxygen tetrahedron and one unit cell has two kinds of overlapping forms between oxygen and a transition metal, and belongs to a space group Cmca. The O6 structure is a layered crystal structure in which lithium exists at the center of an oxygen octahedron and one unit cell has six kinds of overlapping forms between oxygen and a transition metal, and belongs to a space group R-3m.

In the composite oxide A, the content of Li included in the transition metal layer is to be more than 5 mol % and less than 25 mol %, and is preferably more than 10 mol % and less than 20 mol % based on the total number of moles of metal elements included in the transition metal layer from the viewpoint of stability of the crystal structure and the like. The content of Mn is to be more than 40 mol % and less than 75 mol %, and is preferably more than 50 mol % and less than 65 mol % based on the total number of moles of metal elements included in the transition metal layer. The content of Co is to be more than 0 mol % and less than 25 mol %, and is preferably more than 5 mol % and less than 20 mol % based on the total number of moles of metal elements included in the transition metal layer.

The metal element Me included in the composite oxide A other than Li, Mn, and Co is preferably at least one selected from Ni, Fe, Ti, Bi, and Nb. Among them, Ni and Fe are preferable. The content of Me is preferably more than 3 mol % and less than 20 mol % based on the total number of moles of metal elements included in the transition metal layer. The composite oxide A may include a metal element other than the above-described metal elements as long as an object of the present disclosure is not impaired.

The amount of each metal component included in the composite oxide A is measured by inductively coupled plasma (ICP) emission spectroscopic analysis.

The particle size distribution of the composite oxide A has a first peak in the small particle diameter side and a second peak in the large particle diameter side. The particle size distribution of the composite oxide A in the present description refers to volume-based cumulative particle size distribution, and can be measured using a laser diffraction-type particle size distribution measuring device (for example, MT3300EXII manufactured by MicrotracBEL Corp.) with water as a dispersion medium. Although the particle size distribution may have three or more peaks, the following description will be given focusing on the first peak in the small particle diameter side and the second peak in the large particle diameter side.

The composite oxide A includes particles in a first particle group corresponding to the first peak in the small particle diameter side and particles in a second particle group corresponding to the second peak in the large particle diameter side. The waveform indicating the particle size distribution of the composite oxide A is divided at a particle diameter at which the frequency is the smallest between the first peak and the second peak, and thus particles in the composite oxide A are classified into particles in the first particle group and particles in the second particle group. The abundance ratio of the particles in the first particle group included in the composite oxide A is preferably smaller than the abundance ratio of the particles in the second particle group included in the composite oxide A. If the abundance ratio of the particles in the first particle group included in the composite oxide A is smaller than the abundance ratio of the particles in the second particle group included in the composite oxide A, the filling density of the positive electrode active material may be further increased, and the capacity of the secondary battery may be further improved.

The abundance ratio of the particles in the first particle group included in the composite oxide A is, for example, preferably 5% or more and 30% or less, and more preferably 10% or more and 20% or less. The abundance ratio of the particles in the second particle group included in the composite oxide A is, for example, preferably 70% or more and 95% or less, and more preferably 80% or more and 90% or less. The abundance ratio is a value determined from the volume-based relative amount of particles in the first peak or the second peak.

The particles in the first particle group preferably have an average particle diameter (Da) of 30 nm or more and 5 μm or less, and more preferably 40 nm or more and 1 μm or less. The particles in the second particle group preferably have an average particle diameter (Db) of 1 μm or more and 15 μm or less, and more preferably 2 μm or more and 10 μm or less. The ratio (Da/Db) of the average particle diameter (Da) of the particles in the first particle group to the average particle diameter (Db) of the particles in the second particle group is preferably ½ or less. If the average particle diameter (Da) of the particles in the first particle group, the average particle diameter (Db) of the particles in the second particle group, and Db/Da satisfy the above-described ranges, collapse of the crystal structure caused by a charge-discharge cycle is suppressed, and the filling density of the positive electrode active material is improved, and as a result, the capacity of the secondary battery is improved, or a decrease in the capacity maintenance rate in a charge-discharge cycle is suppressed as compared with the case where the above-described ranges are not satisfied. The average particle diameter of the particles in the first particle group is the median of the particle diameter range of the first peak, and the average particle diameter of the particles in the second particle group is the median of the particle diameter range of the second peak.

The particles in the first particle group and the particles in the second particle group may have the same composition or different compositions within the range of the general formula.

The composite oxide A is manufactured by, for example, (1) a first step of manufacturing a composite oxide, as a precursor, including Mn, Co, Li, and Na, and (2) a second step of subjecting the precursor to an ion exchange treatment in a molten salt containing lithium or in a solvent containing a lithium compound.

(First Step)

The composite oxide, as a precursor, including Mn, Co, Li, and Na is manufactured by adding and mixing raw materials such as a sodium compound, a manganese compound, a cobalt compound, and a lithium compound so as to obtain a predetermined molar ratio, and calcinating the obtained mixture. The calcinating temperature of the mixture is preferably in the range of 750° C. or more and 850° C. or less. The calcinating atmosphere is preferably an oxygen atmosphere or the air. By setting the calcinating temperature and the calcinating atmosphere to the above-described conditions, a composite oxide A is easily obtained that exhibits particle size distribution having a first peak in the small particle diameter side and a second peak in the large particle diameter side.

The sodium compound is not particularly limited, and examples of the sodium compound include oxides such as $Na_2O$ and $Na_2O_2$, salts such as $Na_2CO_3$ and $NaNO_3$, and hydroxides such as NaOH. The manganese compound is not particularly limited, and examples of the manganese compound include oxides such as $Mn_3O_4$, $Mn_2O_3$, and $MnO_2$, salts such as $MnSO_4$, $MnCO_3$, and $MnCl_2$, and hydroxides such as $Mn(OH)_2$. The cobalt compound is not particularly limited, and examples of the cobalt compound include oxides such as CoO and $Co_2O_3$, salts such as $CoSO_4$ and $CoCl_2$, and hydroxides such as $Co(OH)_2$. The lithium compound is not particularly limited, and examples of the lithium compound include $Li_2CO_3$, LiOH, and LiCl. As a raw material of the precursor, composite hydroxides such as manganese, nickel, and cobalt, carbonates, and the like can also be used.

(Second Step)

The precursor obtained in the first step is subjected to an ion exchange treatment in a molten salt containing lithium or in a solvent containing a lithium compound to obtain a composite oxide A. As the molten salt containing lithium, for example, salts that melt at a low temperature, such as lithium nitrate, lithium chloride, lithium bromide, and lithium iodide, can be used. As the lithium compound, for example, carbonates of lithium, acetates of lithium, nitrates of lithium, halides of lithium, and the like can be used, and examples of the organic solvent include higher alcohols such as hexanol, ethers such as diethylene glycol monoethyl ether, and organic solvents having a boiling point of 140° C. or more. The treatment temperature in the ion exchange treatment is preferably, for example, 0° C. or more and 300° C. or less. The time for the ion exchange treatment is preferably, for example, 1 hour or more and 48 hours or less.

[Negative Electrode]

The negative electrode 12 includes a negative electrode core and a negative electrode mixture layer provided on a surface of the negative electrode core. As the negative electrode core, a foil of a metal, such as copper, that is stable in a potential range of the negative electrode 12, a film in which the metal is disposed on its surface layer, or the like can be used. The negative electrode mixture layer includes a negative electrode active material and a binder, and is preferably provided, for example, on both surfaces of the negative electrode core excluding a portion to which the negative electrode lead 21 is connected. The negative electrode 12 can be produced by, for example, applying a negative electrode mixture slurry including a negative electrode active material, a binder, and the like to the surface of a negative electrode core, drying the applied film, and then compressing the film to form a negative electrode mixture layer on both surfaces of the negative electrode core.

The negative electrode active material is not particularly limited as long as it is, for example, a material capable of reversibly occluding and releasing lithium ions, and preferably includes a carbon-based active material. Suitable carbon-based active materials are graphite such as natural graphite such as flake graphite, massive graphite, and amorphous graphite and artificial graphite such as massive artificial graphite (MAG) and graphitized mesophase-carbon microbead (MCMB). The negative electrode active material may include a Si-based active material including at least one of Si or a Si-containing compound.

As the binder, fluororesins, PAN, polyimides, acrylic resins, polyolefins, and the like can be used as in the case of the positive electrode 11, but styrene-butadiene rubber (SBR) is preferably used. The negative electrode mixture layer preferably further includes CMC or its salt, polyacrylic acid (PAA) or its salt, polyvinyl alcohol (PVA), or the like. Among them, CMC or its salt, or PAA or its salt is preferably used in combination with SBR.

[Separator]

As the separator 13, for example, a porous sheet having an ion permeation property and an insulating property is used. Specific examples of the porous sheet include fine porous thin films, woven fabrics, and nonwoven fabrics. As a material of the separator 13, polyolefins such as polyethylene and polypropylene, cellulose, and the like are suitable. The separator 13 may have a single-layered structure or a multilayered structure. On a surface of the separator, a heat-resistant layer or the like may be formed.

EXAMPLES

Hereinafter, the present disclosure will be further described with reference to Examples, but the present disclosure is not limited to these Examples.

Example 1

[Synthesis of Positive Electrode Active Material]

$NiSO_4$, $CoSO_4$, and $MnSO_4$ were mixed in an aqueous solution so as to obtain a stoichiometric ratio of 13.5:13.5:73, and were coprecipitated to obtain $(Ni,Co,Mn)(OH)_2$. Next, $(Ni,Co,Mn)(OH)_2$, $Na_2CO_3$, and $LiOH \cdot H_2O$ were mixed so that the stoichiometric ratio of (Ni+Co+Mn):Na:Li was 87:83:13, and this mixture was held at 800° C. for 10 hours in the air to synthesize a precursor.

The composition of the obtained precursor was analyzed using an inductively coupled plasma (ICP) emission spectroscopic analysis device (trade name "iCAP6300" manufactured by Thermo Fisher Scientific Inc.). The result was Na:Li:Mn:Co:Ni=0.756:0.133:0.633:0.117:0.117.

Next, to 5 g of the precursor, a molten salt obtained by mixing lithium nitrate and lithium chloride at a molar ratio of 88:12 was added in an amount of 10 times equivalent (25 g) of the precursor. Thereafter, the mixture was held at 280° C. for 2 hours, ion exchange between Na in the precursor and Li was performed, and lithium iodide was added to the resulting mixture to produce a lithium-transition metal composite oxide.

The composition of the obtained composite oxide was analyzed using an inductively coupled plasma (ICP) emission spectroscopic analysis device (trade name "iCAP6300" manufactured by Thermo Fisher Scientific Inc.). The result was Li:Mn:Co:Ni=1.13:0.724:0.137:0.139. This composite oxide was used as a positive electrode active material.

[Production of Positive Electrode]

The positive electrode active material, acetylene black, and polyvinylidene fluoride (PVdF) were mixed at a mass ratio of 92:5:3, and N-methyl-2-pyrrolidone (NMP) was used as a dispersion medium to prepare a positive electrode mixture slurry. Next, the positive electrode mixture slurry was applied to the surface of a positive electrode core formed using an aluminum foil, the applied film was dried and compressed, and then the resulting product was cut into a predetermined electrode size to produce a positive electrode in which a positive electrode mixture layer was formed on the positive electrode core.

[Preparation of Non-Aqueous Electrolyte Liquid]

In a mixed solvent obtained by mixing fluoroethylene carbonate (FEC) and methyl 3,3,3-trifluoropropionate (FMP) at a mass ratio of 1:3, $LiPF_6$ was dissolved at a concentration of 1 mol/L to prepare a non-aqueous electrolyte liquid.

[Production of Test Cell]

A lead wire was attached to each of the positive electrode and the counter electrode including a Li metal, and the positive electrode and the counter electrode were disposed to face each other with a separator including polyolefin interposed therebetween to produce an electrode assembly. The electrode assembly and the non-aqueous electrolyte liquid were enclosed in an exterior body formed using an aluminum laminate film to produce a test cell.

Example 2

A positive electrode active material was manufactured in the same manner as in Example 1 except that the precursor was synthesized under the calcinating condition of holding at 800° C. for 10 hours in an oxygen atmosphere, and a test cell was produced in the same manner as in Example 1 except that this positive electrode active material was used.

Comparative Example

A positive electrode active material was manufactured in the same manner as in Example 1 except that the precursor was synthesized under the calcinating condition of holding at 900° C. for 10 hours in the air, and a test cell was produced in the same manner as in Example 1 except that this positive electrode active material was used.

[Evaluation of Positive Electrode Active Material]

The positive electrode active materials in Examples 1 and 2 and Comparative Example were measured by X-ray diffraction (XRD) to identify their crystal structures. The positive electrode active materials in Examples 1 and 2 and Comparative Example had an O2 structure belonging to a space group $P6_3mc$ as a main structure.

The particle size distribution of the positive electrode active materials in Examples 1 and 2 and Comparative Example was measured using a laser diffraction-type particle size distribution measuring device (MT3300EXII manufactured by MicrotracBEL Corp.). The particle size distribution of the positive electrode active materials in Examples 1 and 2 had a first peak in the small particle diameter side and a second peak in the large particle diameter side. As a result of analyzing the particle size distribution obtained for the positive electrode active material in Example 1, the abundance ratio of the particles in the first particle group corresponding to the first peak in the small particle diameter side included in the positive electrode active material was 10%, and the abundance ratio of the particles in the second particle group corresponding to the second peak in the large particle diameter side was 90%. The particles in the first particle group corresponding to the first peak in the small particle diameter side had an average particle diameter of 40 nm, and the particles in the second particle group corresponding to the second peak in the large particle diameter side had an average particle diameter of 3 μm.

Meanwhile, the particle size distribution of the positive electrode active material in Comparative Example had only one peak. The positive electrode active material in Comparative Example had an average particle diameter of 3 μm.

[Evaluation of Battery Capacity and Capacity Maintenance Rate in Charge-Discharge Cycle]

The test cells in Examples and Comparative Example were charged at a constant current of 0.05 C in a temperature environment of 25° C. until the closed circuit voltage of the battery reached 4.7 V (reference: Li counter electrode), then charged at a constant voltage of 4.7 V until the current value became less than 0.02 C, and then discharged at a constant current of 0.05 C until the closed circuit voltage of the battery reached 2.0 V (reference: Li counter electrode). This charge and discharge cycle was performed 10 times. The discharge capacity at the first cycle was regarded as the battery capacity, and the results are summarized in Table 1. In addition, the capacity maintenance rate in the charge-discharge cycle was determined with the following formula, and the results are summarized in Table 1.

Capacity maintenance rate (%)=discharge capacity at 10th cycle÷discharge capacity at 1st cycle×100

TABLE 1

| | Positive electrode active material | | | | | | Battery characteristics | |
|---|---|---|---|---|---|---|---|---|
| | | Peak number in particle size distribution | Particles in first particle group | | Particles in second particle group | | | |
| | Structure | | Abundance ratio % | Average particle diameter μm | Abundance ratio % | Average particle diameter μm | Battery capacity mAh/g | Capacity maintenance rate % |
| Example 1 | O2 | 2 | 10 | 0.04 | 90 | 3 | 284 | 94.7 |
| Example 2 | O2 | 2 | 20 | 0.04 | 80 | 3 | 293 | 95.7 |
| Comparative Example | O2 | 1 | — | — | — | — | 266 | 93.4 |

As shown in Table 1, in Examples 1 and 2, the capacity was higher than in Comparative Example, and the decrease in the capacity maintenance rate in the charge-discharge cycle was suppressed. That is, by using the positive electrode active material in Examples, it is possible to provide a secondary battery having a high capacity and exhibiting good cycle characteristics.

REFERENCE SIGNS LIST

10 Secondary battery
11 Positive electrode
12 Negative electrode
13 Separator
14 Electrode assembly
15 Battery case
16 Case body
17 Sealing assembly
18 Insulating plate
18, 19 Insulating plate
20 Positive electrode lead
21 Negative electrode lead
22 Inward protrusion
23 Filter
24 Lower vent member
25 Insulating member
26 Upper vent member
27 Cap
28 Gasket

The invention claimed is:

1. A positive electrode active material for a secondary battery, the positive electrode active material comprising a lithium-transition metal composite oxide,
  the lithium-transition metal composite oxide represented by the general formula $Li_\alpha[Li_xMn_yCO_zMe_{(1-x-y-z)}]O_2$ wherein Me is at least one selected from Ni, Fe, Ti, Bi, and Nb, $0.5<\alpha<1$, $0.05<x<0.25$, $0.4<y<0.75$, and $0<z<0.25$,
  the lithium-transition metal composite oxide having a crystal structure of an O2 structure,
  the lithium-transition metal composite oxide having a particle size distribution having a first peak corresponding to a first particle group and a second peak corresponding to a second particle group,
  wherein the particles in the first particle group have a smaller average particle diameter than the particles in the second particle group.

2. The positive electrode active material for a secondary battery according to claim 1, wherein an abundance ratio of particles in the first particle group contained in the lithium-transition metal composite oxide is smaller than an abundance ratio of particles in the second particle group contained in the lithium-transition metal composite oxide.

3. The positive electrode active material for a secondary battery according to claim 1, wherein
  the particles in the first particle group have an average particle diameter (Da) of 30 nm or more and 5 μm or less, the particles in the second particle group have an average particle diameter (Db) of 2 μm or more and 15 μm or less, and
  a ratio (Da/Db) of the average particle diameter (Da) of the particles in the first particle group to the average particle diameter (Db) of the particles in the second particle group is ½ or less.

4. A secondary battery comprising: a positive electrode including the positive electrode active material for a secondary battery according to claim 1; a negative electrode; and an electrolyte.

* * * * *